United States Patent [19]
Min

[11] Patent Number: 5,321,511
[45] Date of Patent: Jun. 14, 1994

[54] HORIZONTAL EDGE COMPENSATION CIRCUIT FOR A DIGITAL IMAGE PROCESSOR

[75] Inventor: Byeong-min Min, Seoul, Rep. of Korea

[73] Assignee: SamSung Electronics Co., Ltd., Kyungki, Rep. of Korea

[21] Appl. No.: 757,928

[22] Filed: Sep. 12, 1991

[30] Foreign Application Priority Data

Sep. 28, 1990 [KR] Rep. of Korea .................... 90 15771

[51] Int. Cl.$^5$ ........................................... H04N 5/208
[52] U.S. Cl. ................................. 348/625; 348/616; 348/614; 348/678
[58] Field of Search ................ 358/166, 37, 174, 162; H04N 5/208

[56] References Cited

U.S. PATENT DOCUMENTS

| | | | |
|---|---|---|---|
| 4,030,121 | 6/1977 | Faroudja | 358/166 |
| 4,262,304 | 4/1981 | Faroudja | 358/37 |
| 4,263,616 | 4/1981 | Lee | 358/166 |
| 4,771,192 | 9/1988 | Jackson | 358/174 |
| 4,931,858 | 6/1990 | Honjo | 358/37 |

FOREIGN PATENT DOCUMENTS

2241408 8/1991 United Kingdom ........ H04N 5/208

*Primary Examiner*—James J. Groody
*Assistant Examiner*—Jeffrey S. Murrell
*Attorney, Agent, or Firm*—Robert E. Bushnell

[57] ABSTRACT

A horizontal edge compensation circuit includes a delay circuit for delaying an input luminance signal for a certain time, a waveform converter for differentiating the input luminance signal to take its absolute value, and reshaping the waveform of the signal, a quantization circuit for differentiating again the first differentiated signal, comparing to predetermined reference levels the first differentiated signal obtained by emphasizing a signal having a low level difference and bypassing a signal having a high level difference, and then generating a code signal to quantize the second differentiated signal, a gain controller for selectively multiplying the reshaped signal according to the code signal, and controlling the degree of horizontal edge compensation, and an adder for adding the luminance signal delayed for a certain time in the delay circuit to the horizontal edge compensation signal output from the gain control portion. The circuit reduces transition time of luminance level of a video signal and boosts a signal having a low level difference to emphasize the horizontal edge, thereby improving the resolution of a picture.

24 Claims, 17 Drawing Sheets

HORIZONTAL EDGE COMPENSATION CIRCUIT FOR A DIGITAL IMAGE PROCESSOR

BACKGROUND OF THE INVENTION

The present invention relates to a video signal processing circuit adapted in a video apparatus such as TV, VTR, video camera, etc., and particularly to a horizontal edge compensation circuit for greatly reducing a transition time of a luminance signal level and performing a horizontal edge compensation, to improve a sharpness of the reproduced image.

Generally, when the number of lines per frame and the number of frames per second have been fixed, the horizontal resolution is largely a function of a system bandwidth during reproduction of the recorded video signal. The frequency spectrum of a standard composite video signal for use in a NTSC color television is as shown in FIG. 1, where the bandwidth of the luminance signal Y is 4.2 MHz, and in the color difference signal channels, a 1.3 MHz bandwidth for the I channel and a 500 KHz bandwidth for the Q channels are arranged centering around a color subcarrier frequency fsc of 3.58 MHz. More particularly, the recent NTSC helical scan video recorders have resulted in the appearance of low luminance bandwidth (2 MHz) and chroma bandwidth (350 KHz) pictures, due to their high portability and low cost. These low bandwidth composite video signals make it difficult to obtain a high-resolution picture. If the luminance and chrominance signal bandwidths were wider, a sharper picture would be possible. However, in this case, the transmitting and receiving systems should be modified, which would increase the production costs of the transmitter and receiver. And so, studies on the horizontal edge compensation have been continued in order to enhance the sharpness of pictures without any change to the bandwidths of the standard luminance and chrominance signals. Examples of prior arts relevant to the technological field of the present invention are described in U.S. Pat. No. 4,030,121 to Faroudja, U.S. Pat. No. 4,414,564 to Hitchcock, U.S. Pat. No. 4,263,616 to Lee, U.S. Pat. No. 4,853,783 to Ozaki.

FIG. 2 shows a conventional horizontal edge compensation circuit. The circuit of FIG. 2 comprises a first path including a delay circuit 10 for delaying an input luminance signal for a certain period, a second path including a band-pass filter 20 which is tuned to a frequency to compensate the horizontal edge, and an adder 70 for summing signals supplied from the first and second paths. The second path includes band-pass filter 20, coring unit 21, gain control unit 22, and limiter 60.

FIG. 3 illustrates the frequency response of the band-pass filter 20 which is tuned to 3.58 MHz.

FIGS. 4A through 4D illustrate waveforms showing operational characteristics of the respective components of the horizontal edge compensation circuit of FIG. 2 including the above band-pass filter 20. The small circles 5 represent sampling points with the frequency of the sampling clock at 4 fsc (4×3.58=14.3 MHz).

If luminance signal Y as shown in FIG. 4A is fed to the horizontal edge compensation circuit of FIG. 2, the band-pass filter 20 differentiates the luminance signal Y as shown in FIG. 4B, and then, outputs a frequency component tuned to 3.58 MHz. The band-pass filter 20 differentiates the above differentiated signal again, and then outputs the signal as shown in FIG. 4C. The coring unit 21 removes the noises having small amplitude impulse components or noise spikes from the edge-compensating component output from the band-pass filter 20. The gain control unit 22 controls the gain of the noise-removed horizontal edge compensating component. The gain control unit 22 controls the size of the horizontal edge compensating signal in order to compensate the horizontal edge of a primary signal as shown in FIG. 5. The limiter 60 limits the horizontal edge compensating signal generated from the gain control unit 22 to a certain size, and supplies the signal to the adder 70. The adder 70 adds the luminance signal supplied via the first path including the delay circuit 10 to the horizontal edge compensation signal supplied via the second path, and outputs luminance signal $Y_1$ in which the horizontal edges are compensated as shown in FIG. 4D. At this time, the horizontal edge compensating signal of FIG. 4C is actually subtracted from the primary signal.

The signal whose horizontal edge is compensated as shown in FIG. 5 enhances the sharpness of the displayed video signal by further increasing the level difference in the transition interval of the video signal. The effects of the conventional horizontal edge compensation circuit, however, are extremely limited because the circuit compensates the edge of a single extracted frequency component of limited bandwidth.

FIG. 6 illustrates another embodiment of the conventional horizontal edge compensation circuit.

The horizontal edge compensation circuit in FIG. 6 which is an improvement over the circuit in FIG. 2, comprises a delay circuit 10 for delaying the input luminance signal Y for a certain period, band-pass filters 20, 30 and 40 which are each supplied with luminance signal Y, coring units 21, 31 and 41 which are coupled to the output of each band-pass filter, gain control units 22, 32 and 42 which are coupled to the output of each coring unit, a mixer 50 for mixing the output signal from each gain control unit, and a limiter 60 for limiting the magnitude of the output signal from the mixer 50, an adder 70 for adding the luminance signal supplied from the delay circuit 10 to the horizontal edge compensation signal supplied from the limiter 60 to provide the luminance signal $Y_2$ whose horizontal edge is compensated.

The basic operation of the horizontal edge compensation circuit in FIG. 6 is the same as that of the circuit in FIG. 2. However, the horizontal edge compensation circuit of FIG. 6 obtains a horizontal edge compensation signal over a wider frequency bandwidth than that of the circuit of FIG. 2. For instance, the band-pass filters 20, 30 and 40 extract the component tuned to the frequencies of f1=2.3 MHz, f2=3.58 MHz and f3=4.58 MHz as shown in FIG. 7, respectively. Then, the mixer 50 does not emphasize the particular horizontal edge compensation component by simply adding the respective horizontal edge compensation components extracted at the different frequency bandwidths each other according to the characteristics of the band-pass filters 20, 30 and 40, but it emphasizes or suppresses the particular edge compensation component by adding or subtracting the three horizontal edge compensation component to or from one another. The characteristic of the mixer 50 for mixing the three different horizontal edge compensation components appropriately in order to emphasize a particular component is shown in FIG. 8.

FIG. 8 in which the axis of ordinate represents gains and the axis of abscissa represents frequencies illustrates the horizontal edge compensation signals having three different frequencies f1, f2 and f3. Such different horizontal edge compensation signals are added or subtracted to or from one another to obtain various horizontal compensation signals.

The horizontal edge compensation signal is added to the primary signal which passed through the delay circuit 10 of FIG. 6, thereby obtaining a sharper horizontal edge-compensated luminance signal $Y_2$. However, since the aforementioned two conventional horizontal edge compensation circuits extract horizontal edge compensation components from particular frequencies to add the components, the circuits have disadvantages in that, when the level of video signal is changed, a trailing phenomenon that the falling length tails away occurs because an overshot frequency component is converted to higher harmonics of the particular frequencies and the transition time of a video signal cannot be contracted.

In order to solve these problems, still another conventional horizontal edge compensation circuit is as shown in FIG. 9.

The horizontal edge compensation circuit in FIG. 9 comprises delay circuit 85 for delaying an input luminance signal Y for a certain period, a first differentiator 80 for differentiating the luminance signal Y, a second differentiator 81 for again differentiating the output of the first differentiator, a limiter 83 for limiting the size of the second differentiated signal, an absolute value (ABS) circuit 82 for obtaining the absolute value of the first differentiated signal, a multiplier 84 for multiplying the absolute value of the first differentiated signal by the limited second differentiated signal, and an adder 86 for summing the outputs of multiplier 84 and delay circuit 85, to output a horizontal edge-compensated luminance signal $Y_3$.

If the luminance signal Y as shown in FIG. 10A is input to the horizontal edge compensation circuit of FIG. 9, the luminance signal Y is differentiated by the first differentiator 80 to provide the first differentiated signal as shown in FIG. 10B. The first differentiated signal is supplied to the second differentiator 81 and simultaneously is passed through the absolute value circuit 82 coupled in parallel to the second differentiator 81. The signal as shown in FIG. 10C which is obtained by differentiating again the first differentiated signal in the second differentiator 81 and then passing through the limiter 83, is supplied to the multiplier 84. The multiplier 84 multiplies the absolute value of the first differentiated signal supplied through the absolute value circuit 82 by the signal output from the limiter 83, resulting in obtaining the horizontal edge compensation signal as shown in FIG. 10D.

The horizontal edge compensation signal obtained by multiplying the first differentiated signal by the second differentiated signal becomes harmonics higher than 3.58 MHz horizontal edge compensation signal. In the adder, the horizontal edge compensation signal is added to the primary signal which has been delayed for a certain time in the delay circuit 85, to become a horizontal edge-compensated luminance signal $Y_3$ as shown in FIG. 10E. At this time, the horizontal edge compensation signal of FIG. 10D is actually subtracted from the primary signal.

As described above, the conventional horizontal edge compensation circuit shown in FIG. 9 improves the sharpness of a picture by reducing the trailing of the horizontal edge compensation signal and also the transition time of the level of a video signal. But, since the horizontal edge compensation circuit in FIG. 9 adds a second higher harmonics to the horizontal edge compensation component, the circuit has a unnecessarily long trailing and roll-off that the picture becomes dim even if the transition time of the level of the video signal is short.

SUMMARY OF THE INVENTION

Therefore, it is an object of the present invention to provide a horizontal edge compensation circuit which improves the resolution of a picture while maintaining standard frequency bandwidths in a video processing system.

It is a further object of the present invention to provide a horizontal edge compensation circuit which shortens the transition time of the level of the video signal and controls the degree of roll-off by preventing the second higher harmonic component from being included in the horizontal edge compensation signal when compensating the horizontal edge of the picture.

To achieve the object, the horizontal edge compensation circuit of the present invention comprises a delay unit for delaying a luminance signal Y for a certain time, a waveform converter for differentiating the input luminance signal Y, to obtain an absolute value of the just differentiated signal, and then to reshape the waveform of the absolute-valued signal, a quantization unit for differentiating again the first differentiated signal, then comparing the predetermined reference levels with the second differentiated signal obtained by emphasizing a signal having a low level difference and bypassing a signal having a high level difference, and then generating a code signal to quantize and output the second differentiated signal, a gain controller for selectively multiplying the reshaped signal according to the code signal, and then controlling the degree of horizontal edge compensation, and an adder for adding the luminance signal delayed for a certain time in the delay unit to the horizontal edge compensation signal output from the gain controller.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OF THE INVENTION

A preferred embodiment of the present invention will be described in detail below with reference to the attached drawings.

Figure 1:
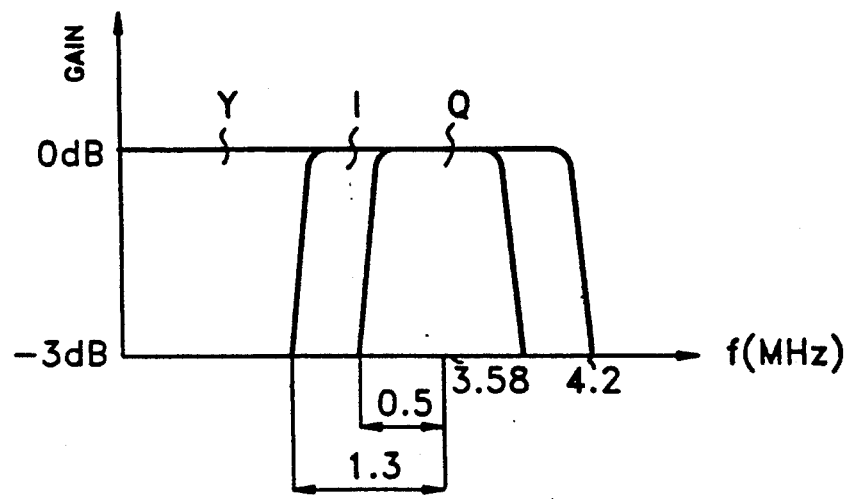
FIG. 1 is a frequency spectral view of a composite video signal in a standard NTSC color television.
Figure 2:
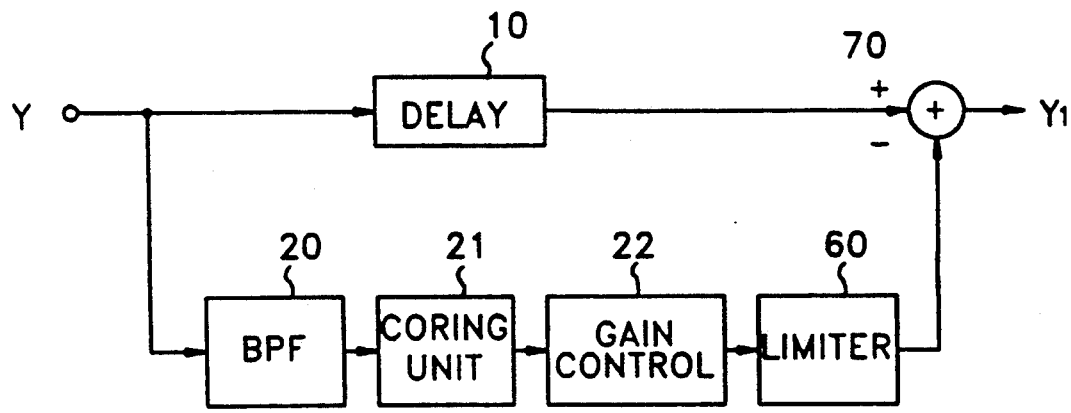
FIG. 2 is a block diagram of a conventional horizontal edge compensation circuit.
Figure 3:
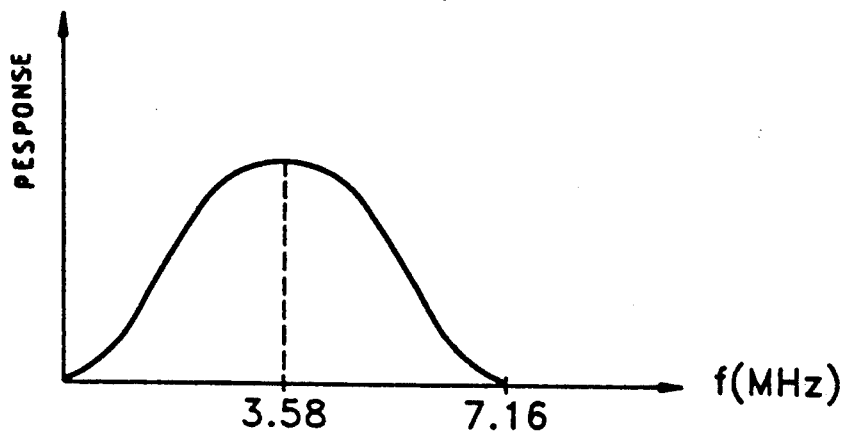
FIG. 3 is a graph showing the frequency response of the band-pass filter in the horizontal edge compensation circuit of FIG. 2.
Figure 5:
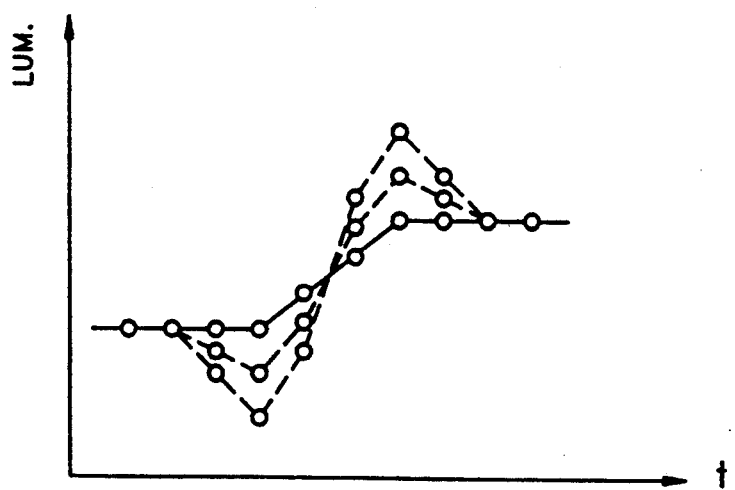
FIG. 5 is a waveform showing the state of controlling gain in FIG. 2.
Figure 4A:
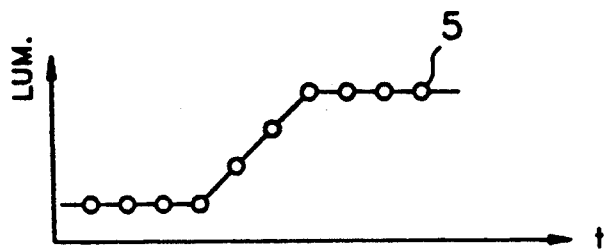
FIGS. 4A through 4D are waveforms of the respective components showing the operation of the horizontal edge compensation circuit in FIG. 2.
Figure 4B:
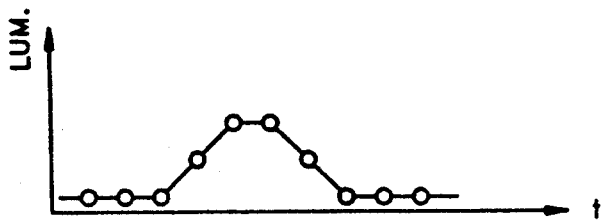
Figure 4C:
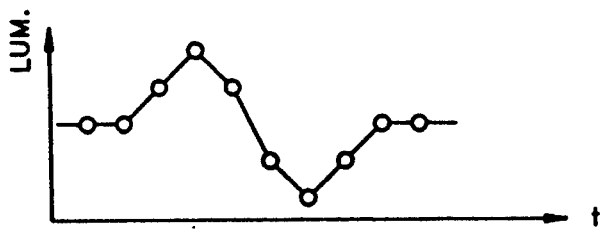
Figure 4D:
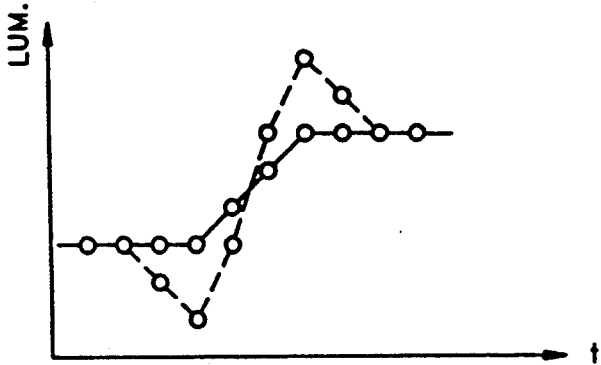
Figure 6:
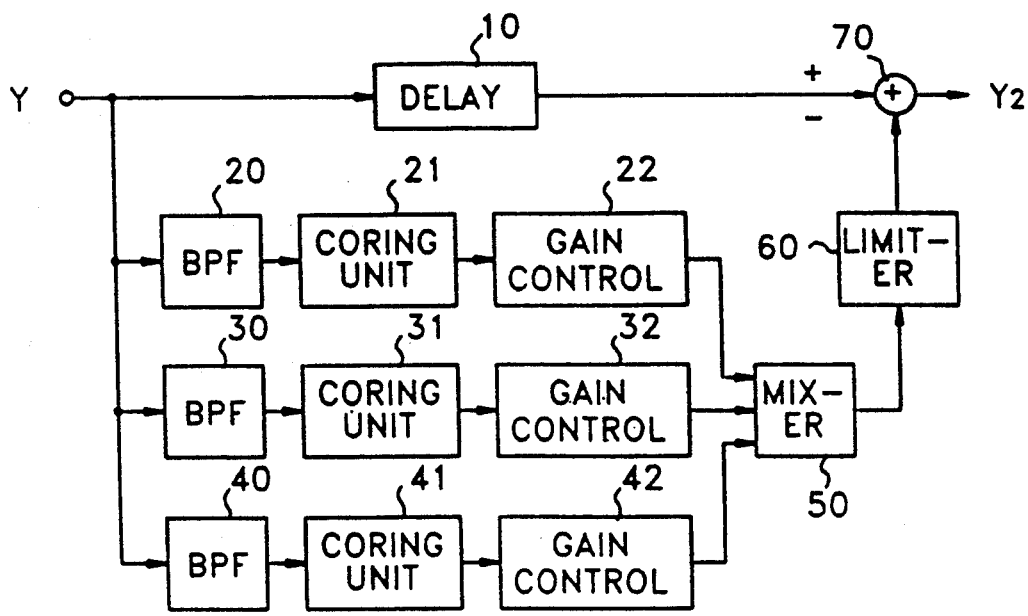
FIG. 6 is a block diagram showing another embodiment of a conventional horizontal edge compensation circuit.
Figure 7:
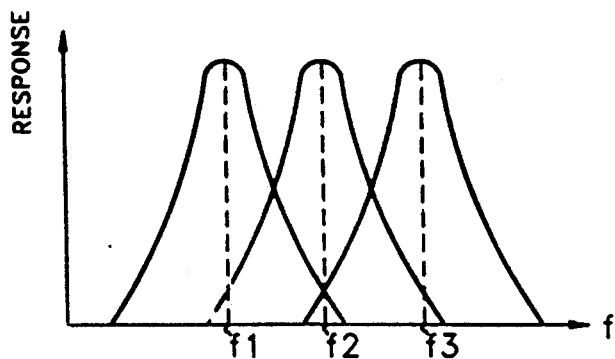
FIG. 7 is a graph showing the frequency responses of each band-pass filter in the horizontal edge compensation circuit of FIG. 6.
Figure 8:
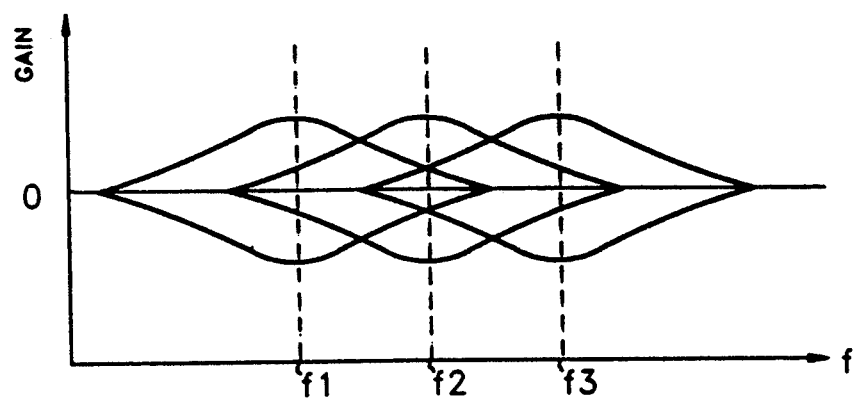
FIG. 8 is a graph showing the output of the mixer with respect to each frequency path of the horizontal edge compensation circuit in FIG. 6.
Figure 9:
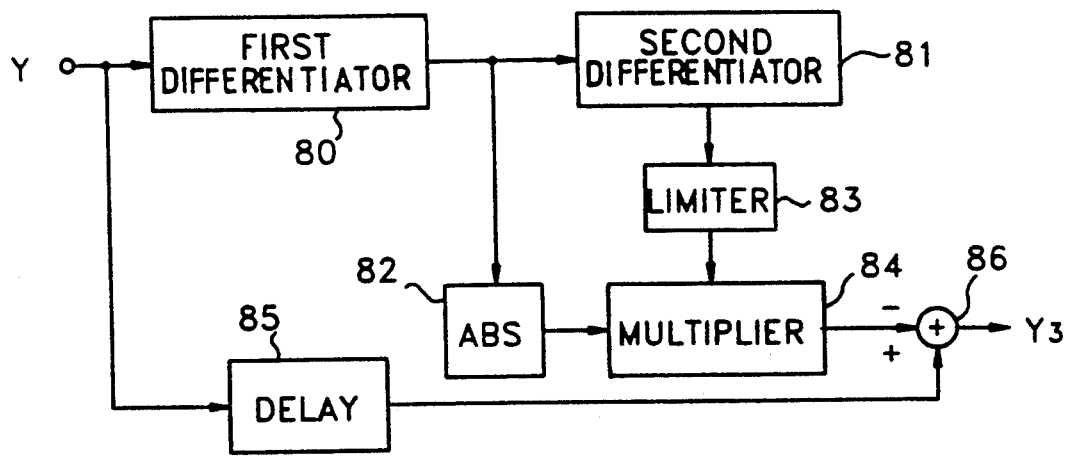
FIG. 9 is a block diagram of still another embodiment of a conventional horizontal edge compensation circuit.
Figure 10A:
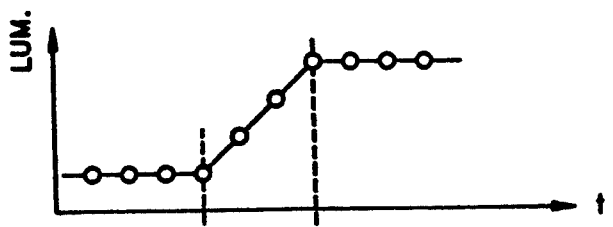
FIGS. 10A through 10E are waveforms showing the operation of the horizontal edge compensation circuit in FIG. 9.
Figure 10B:
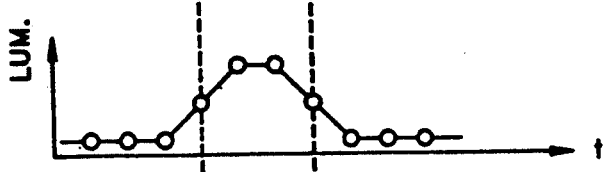
Figure 10C:
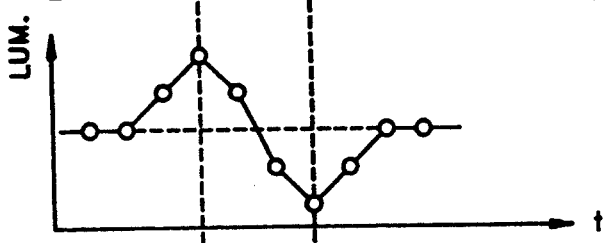
Figure 10D:
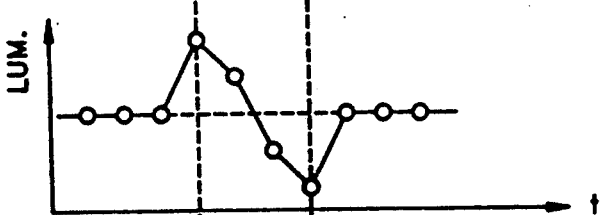
Figure 10E:
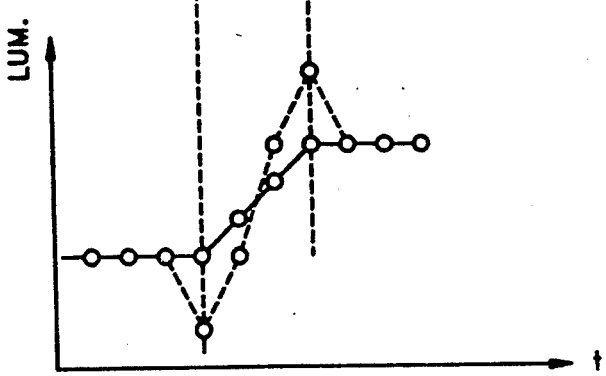
Figure 11:
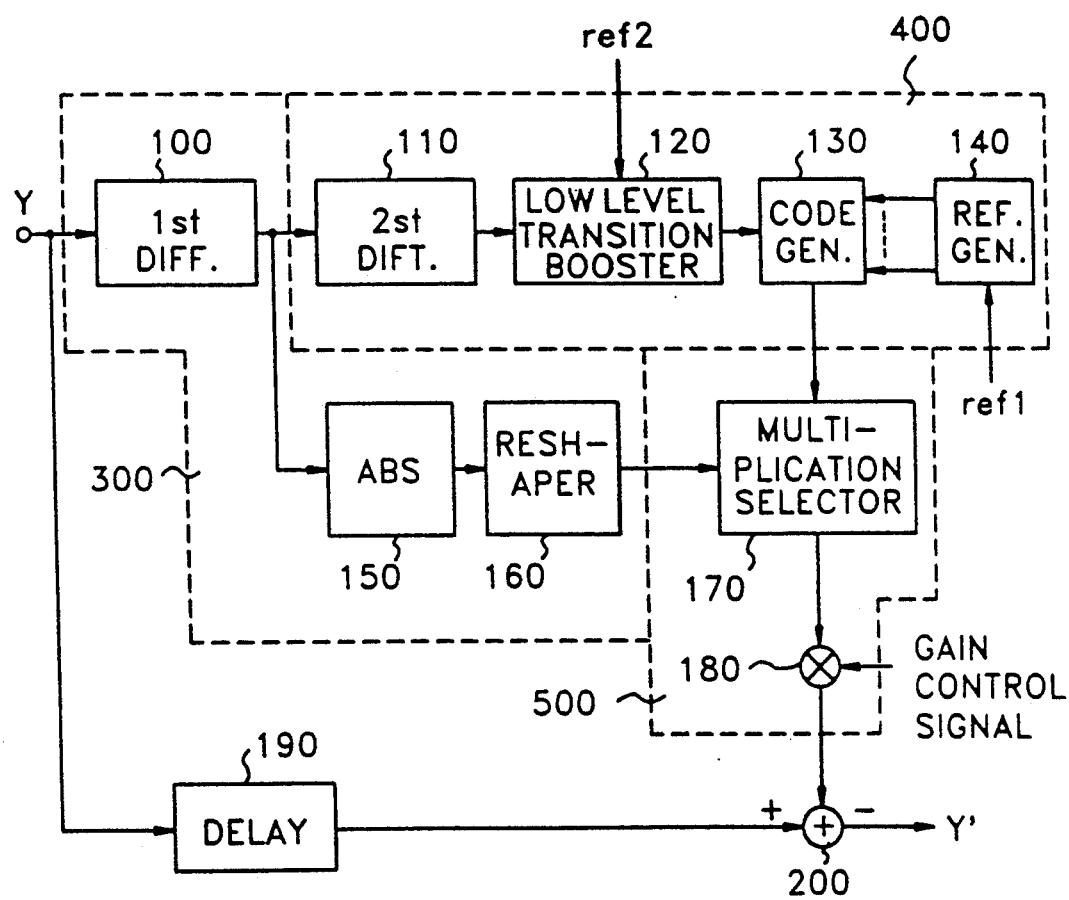
FIG. 11 is a block diagram of an embodiment of a horizontal edge compensation circuit according to the present invention.

FIG. 11 illustrates a preferred embodiment of a horizontal edge compensation circuit of the present invention. The circuit comprises a first path for delaying an input luminance signal Y for a certain time to the supply to adder 200, a second path for generating and supplying a horizontal edge compensation signal of which the magnitude is controlled adaptively to a level change of the input luminance signal, and an adder 200 for adding the luminance signal supplied from the first path to the horizontal edge compensation signal supplied from the second path. The waveform converter 300 for reshaping a waveform on the second path comprises a first differentiator 100 for differentiating the input luminance signal Y, an absolute value circuit 150 for taking the absolute value of the output signal of the first differentiator 100, and a waveform reshaper 160 coupled to the output terminal of the absolute value circuit 150, for reshaping the waveform of the absolute value signal of the first differentiated signal during a certain period. A quantization unit 400 on the second path comprises a second differentiator 110 for differentiating again the first differentiated signal of the input luminance signal Y, a low level transition booster 120 for amplifying and outputting the second differentiated signal supplied from the second differentiator 110 at a predetermined amplification rate if the second differentiated signal is lower than a predetermined second reference signal ref2, or bypassing the second differentiated signal if the former is higher than the latter, and a code generator 130 which is coupled to the output terminals of both the low level transition booster 120 and a reference signal generator 140, for outputting a plurality of reference signals by receiving a first reference signal ref1, for comparing the output signal of the low level transition booster 120 with the reference signals outputted from the reference signal generator 140 to generate a specific bit code. A gain controller 500 on the second path comprises a multiplication selector 170 which is coupled to both the code generator 130 of the quantization 400 and the waveform reshaper 160 of the waveform converter 300, respectively for selecting a multiplication value according to the code supplied from the code generator 130, and multiplying the signal outputted from the waveform reshaper 160 by the multiplication value to output the result, and an adder 180 for receiving the output signals of the multiplication selector 170 and a gain control signal so as to have the output signal of the multiplication selector 170 get a certain gain.

Figure 13:
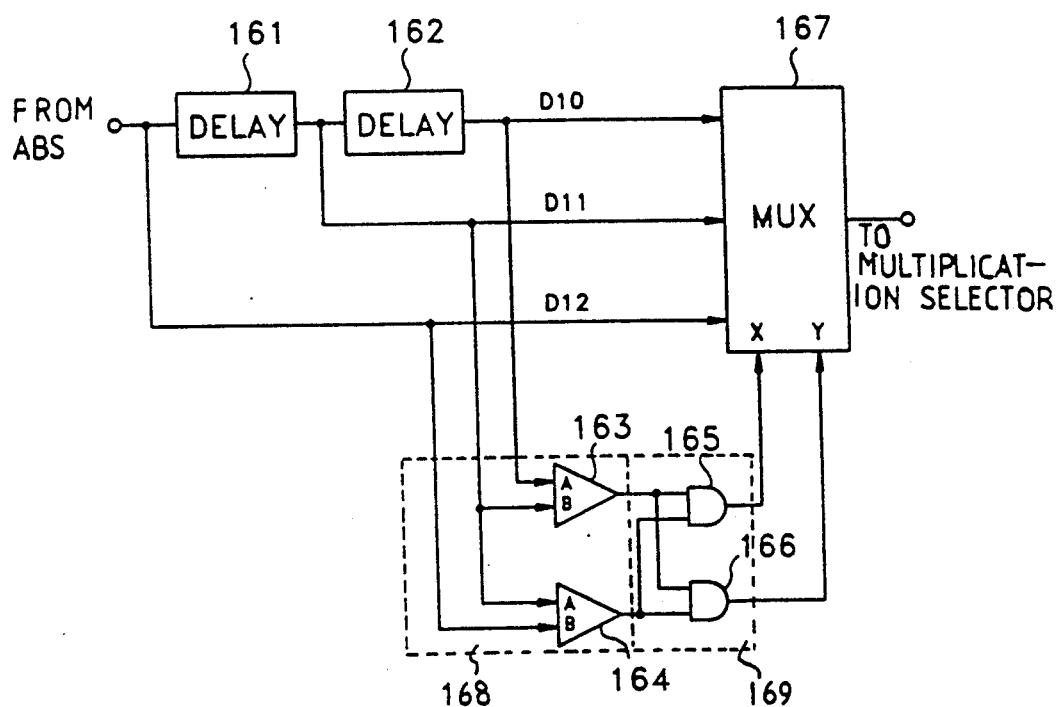
FIG. 13 is a block diagram showing one embodiment of the waveform reshaper 160 of the horizontal edge compensation circuit in FIG. 11.

The preferred waveform reshaper 160 of the horizontal edge compensation circuit of FIG. 11 is shown in FIG. 13. The waveform reshaper 160 comprises first and second delay circuits 161 and 162 for delaying and outputting the output signal of the absolute value circuit 150 for a certain time, a comparing unit 168 having a first comparator 163 coupled to the output terminals of the first and second delay circuits 161 and 162, for comparing the output signal D11 of the first delay circuit 161 with the output signal D10 of the a second delay circuit 162, second comparator 164 coupled to the output terminals of absolute value circuit 150 and the first delay circuit 161, for comparing the output signal D12 of the absolute value circuit 150 with the output signal D11 of the first delay circuit 161, a logic unit 169 having first and second AND gates 165 and 166 coupled respectively to the output terminals of the first and second comparators 163 and 164, for outputting a selection signal, and a multiplexer 167 for selecting and outputting a data signal among the data signals D10, D11 and D12 according to the selection signal supplied from the first and second AND gates 165 and 166.

Figure 14A:
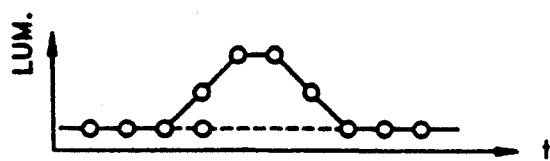
FIG. 14 is a block diagram showing one embodiment of the low level transition booster 120 of the horizontal edge compensation circuit in FIG. 11.
Figure 14B:
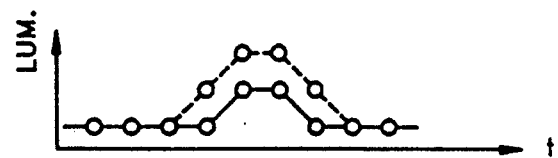
Figure 14:
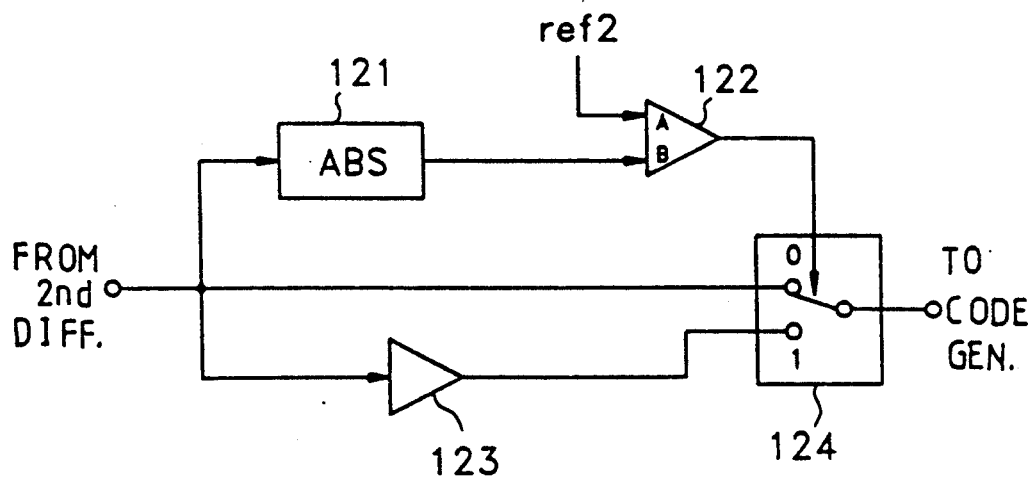
Figure 21:
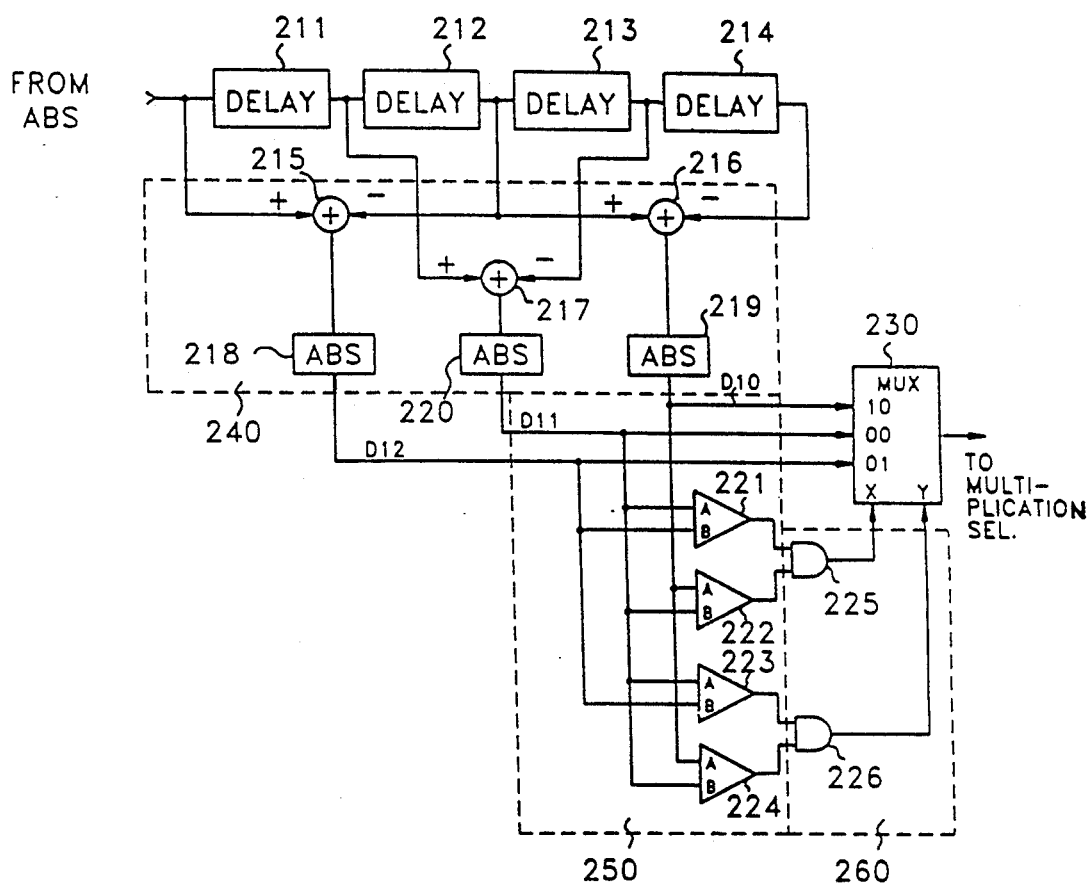
FIG. 21 is a block diagram showing another embodiment of the waveform reshaper 160 of the horizontal edge compensation circuit in FIG. 11.

Another embodiment of the waveform converter 300 is illustrated in FIG. 21. The waveform reshaper 160 of FIG. 21 comprises delay circuits 211, 212, 213 and 214 for supplying the data signals D10, D11 and D12 which are compared each other, an operation unit 240 having adders 215, 216, and 217 and absolute value circuits 218, 219 and 220 for calculating the luminance signal fed to the waveform reshaper 160 and the luminance signals outputted from the delay circuits 211, 212, 213 and 214, then taking their respective absolute values to generate the data signals D10, D11 and D12, a comparing unit 250 having comparators 221, 223 for receiving the different data signals D11 and D12 among the data signals to compare their sizes and comparators 222, and 224 for receiving the different data signals D10 and D11 among the data signals to compare their sizes, a logic unit 260 having a first AND gate 225 for receiving the output signals of the comparators 221, 222, to output a selection signal, and a second AND gate 226 for receiving the outputs signals of the comparators 223 and 224 to output another selection signal, and a multiplexer 230 for selecting and outputting a data signal among the data signals D10, D11 and D12 according to the selection signal. That is, the waveform reshapers of FIG. 13 and FIG. 21 compare the data signals D10, D11 and D12 obtained by the first differentiated signal, and detects the falling edge or the rising edge of the input luminance signal Y, and selects necessary sampling data according to the respective edges. The detailed circuit of the low level transition booster 120 of FIG. 11 is illustrated in FIG. 14. The low level transition booster 120 comprises an absolute value circuit 121 for taking an absolute value of the second differentiated signal output from the second differentiator 110, a comparator 122 for comparing the output signal of the absolute value circuit 121 to a predetermined second reference signal ref2 to output a logic signal, and a switch device 124 for selecting and outputting the second differentiated signal supplied from the second differentiator 110 or a second differentiated signal amplified by an amplifier 123 according to the logic signal.

Figure 19:
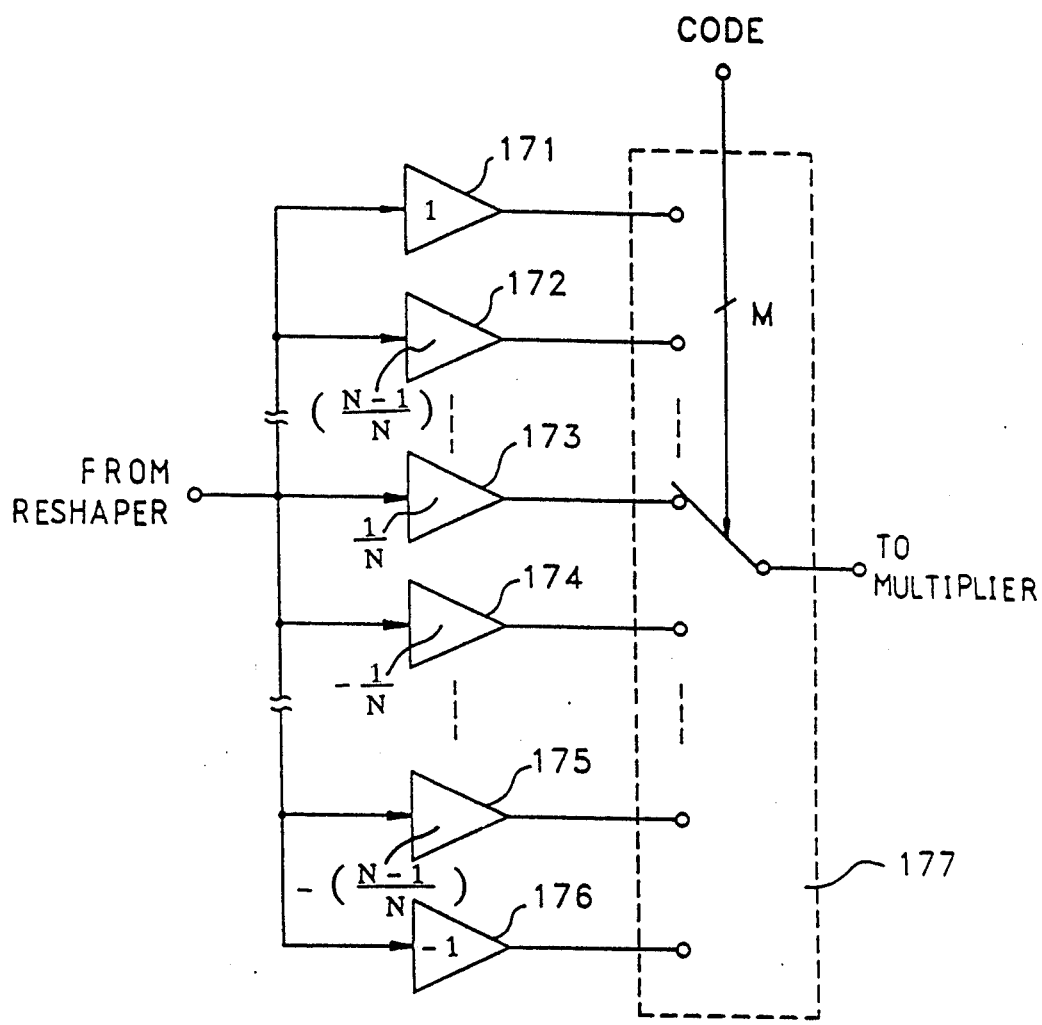
FIG. 19 is a block diagram showing one embodiment of the multiplication selector 170 of the horizontal edge compensation circuit in FIG. 11.

The detailed circuit of the multiplication selector 170 of FIG. 11 is illustrated in FIG. 19. The multiplication selector 170 comprises a plurality of amplifiers 171, 172, 173, 174, 175, and 176 for amplifying the output signals of the waveform reshaper 160 by a certain amplification rate, and a switch device 177 for selecting and outputting one of the respective output signals from the amplifiers according to a code supplied from the code generator 130.

Figure 12A:
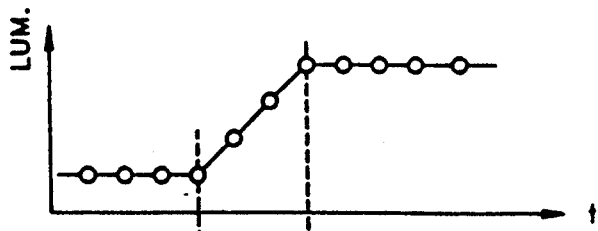
FIGS. 12A through 12F are waveforms of the respective components showing the operation of the horizontal edge compensation circuit in FIG. 11.
Figure 12B:
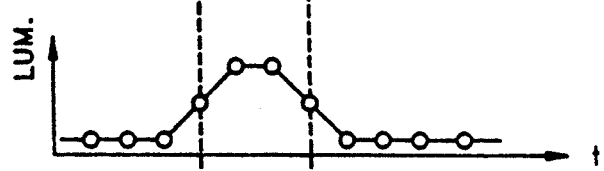
Figure 12C:
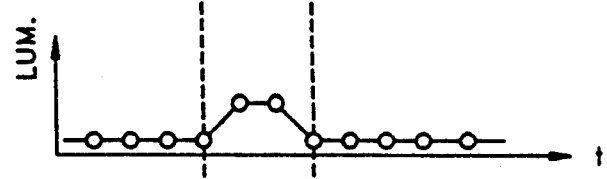

If the luminance signal Y as shown in FIG. 12A is input to the horizontal edge compensation circuit according to the present invention, the luminance signal Y is differentiated in the first differentiator 100 to take the absolute value and then the resultant signal is the same as that of FIG. 12B. The absolute value signal of the first differentiated signal is supplied to the waveform reshaper 160 to reshape the waveform as shown in FIG. 12C. As shown in FIG. 13, the waveform reshaper 160 generates data signals D10 and D11 to be compared when the absolute value signal D12 of the first differentiated signal passes through the first and second delay circuits 161 and 162. The data signals D10, D11 and the absolute value signal D12 including the absolute value signal are compared to one another in the first and second comparators 163 and 164 so as to output logic signals. The logic signals are logically summed in the first and second AND gates 165 and 166 to output a selection signal. The multiplexer 167 selects and outputs one of the data signals D10, D11 and D12 according to the selection signal. The data signals D10, D11 and D12 have the following two cases:

$$D10 \leq D11 \leq D12 \quad (1)$$

$$D10 \geq D11 \geq D12 \quad (2).$$

In the multiplexer 167, if the rising edge of the first differentiated signal is detected as represented in the first expression (1), the multiplexer 167 is switched from the sampling data of D11 to the sampling data of D10, and if the falling edge of the first differentiated signal is detected as represented in the second expression (2), the multiplexer 167 is switched from the sampling data of D11 to the sampling data of D12.

That is, the data signals D10 and D11 and the absolute value signal D12 supplied from the first and second delay circuits 161 and 162 are compared to one another in the first and second comparators 163 and 164 to obtain logic signals, then the logic signals are logically summed in the first and second AND gates 165 and 166 to obtain selection signal. The selection signal is used to control the multiplexer 167 to reshape the waveform.

Figure 12D:
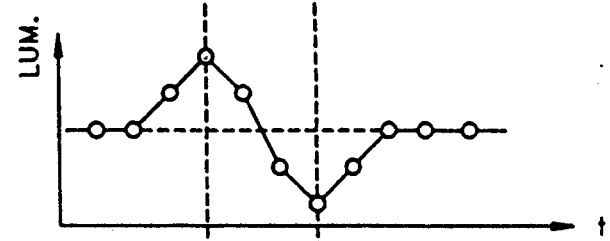

The horizontal edge compensation signal is processed only in a predetermined interval as shown in FIG. 12A through FIG. 12F by reshaping the waveform as described above, thereby preventing the lengthening of the horizontal edge compensation signal as harmonics. The first differentiated signal output from the first differentiator 100 is fed to the second differentiator 110 to output the second differentiated signal as shown in FIG. 12D. Only a luminance signal having a low level difference of the second differentiated signal is boosted up in the low level transition booster 120.

The boost up examples of the second differentiated signal are illustrated in FIGS. 15A through 15D, and FIGS. 16A and 17B.

Figure 15A:
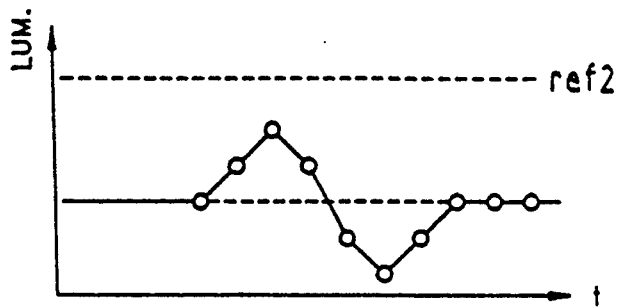
FIGS. 15A through 15D are waveforms of input and output signals according to the operation of the low level transition booster 120 in FIG. 14.
Figure 15B:
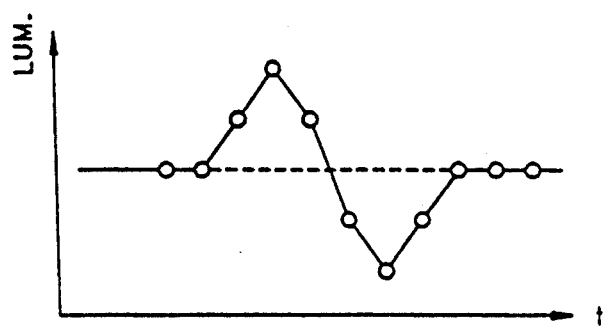
Figure 15C:
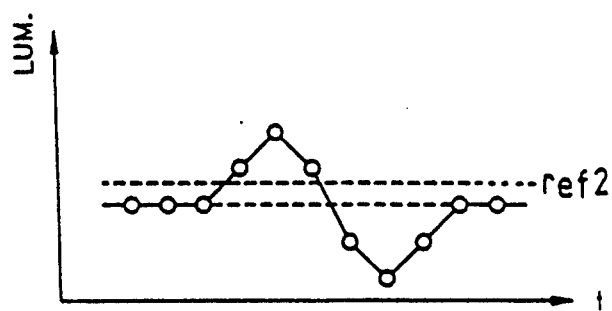
Figure 15D:
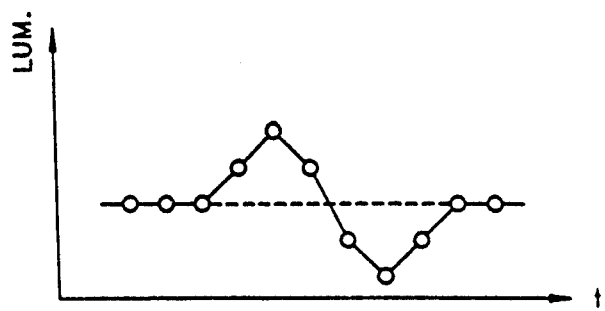
Figure 16A:
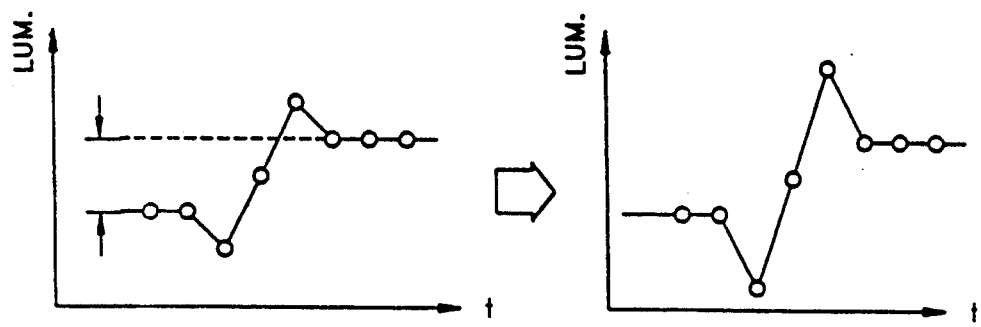
FIGS. 16A and 16B are waveforms showing the function of the low level transition booster 120 in FIG. 14.
Figure 16B:
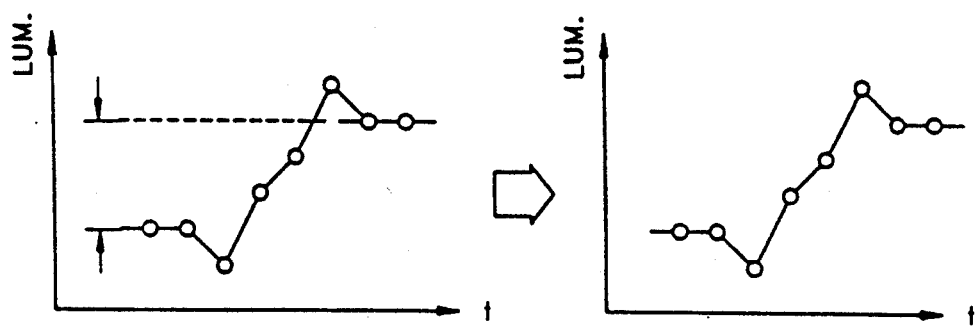

The second differentiated signal is applied to the comparator 122 via the absolute value circuit 121 in the low level transition booster 120 as shown in FIG. 14. The comparator 122 compares the absolute value signal of the second differentiated signal to a predetermined second reference signal ref2. Then, when the absolute value is larger than the second reference signal ref2 as shown in FIG. 15C, switch 124 is coupled as shown in FIG. 14 to output the second differentiated signal as it is as shown in FIG. 15D. When the absolute value of the second differentiated signal is smaller than the second reference signal ref2 as shown in FIG. 15A, the switch 124 is coupled to an input terminal 1 so that the second differentiated signal is amplified in the amplifier 123 and output as shown in FIG. 15B. In other words, if a luminance signal having a low level difference is input as shown in FIG. 16A, the luminance signal is amplified at a certain rate to emphasize an edge compensation component, and if a luminance signal having a high level difference is inputted as shown in FIG. 16B, an original edge compensation signal is sustained as it is.

The reason for having different amplification rates for the edge compensation signal in accordance with the size of level difference of the luminance signal is to boost up the edge compensation signal only in the case of a luminance signal having a low level difference because the human eyes can perceive a high level difference of a luminance signal but not a low level difference.

As described above, the low level transition booster 120 compares the absolute value signal of the second differentiated signal to the second reference signal ref2, and as a result, it boosts up the second differentiated signal at a certain amplification rate if it is smaller than the second reference signal ref2, and has the absolute value signal of the second differentiated signal pass by if it is larger than the second reference signal ref2.

Figure 12E:
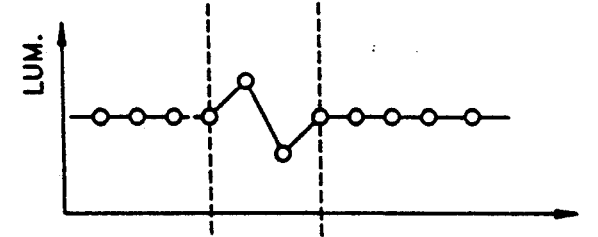
Figure 12F:
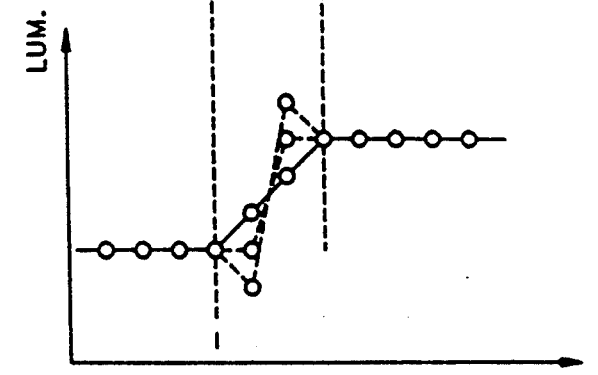
Figure 17:
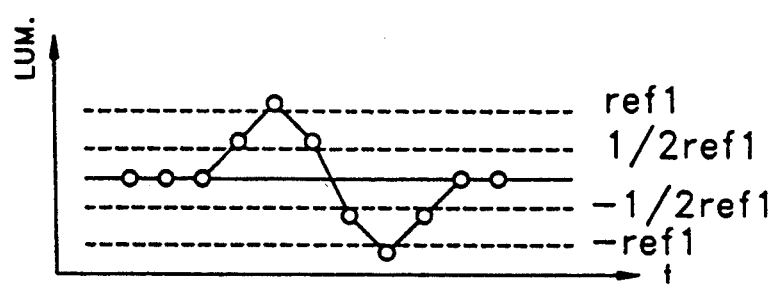
FIG. 17 is waveform showing the operation of the reference signal generator 140 of the horizontal edge compensation circuit in FIG. 11.
Figure 18:
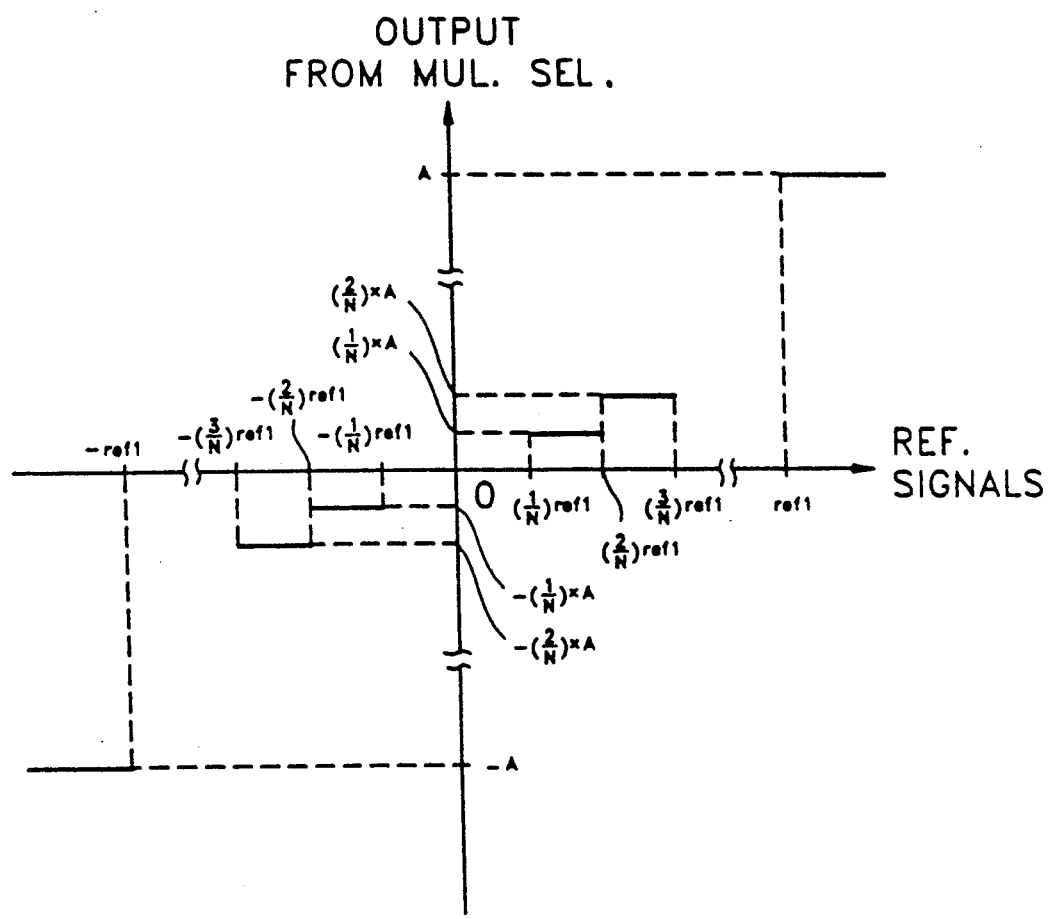
FIG. 18 is a graph showing the input and output characteristic 170 of the multiplication selector of the horizontal edge compensation circuit in FIG. 11.
Figure 20A:
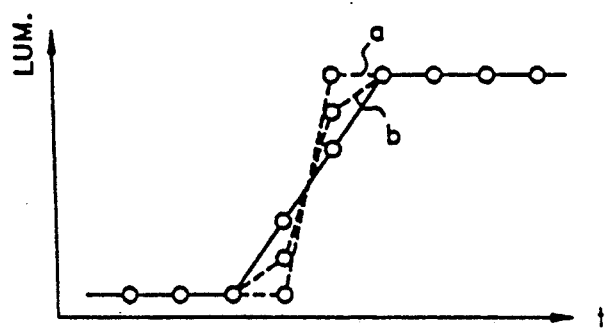
FIGS. 20A and 20B are waveforms showing a signal whose horizontal edge is compensated by the horizontal edge compensation circuit in FIG. 11.
Figure 20B:
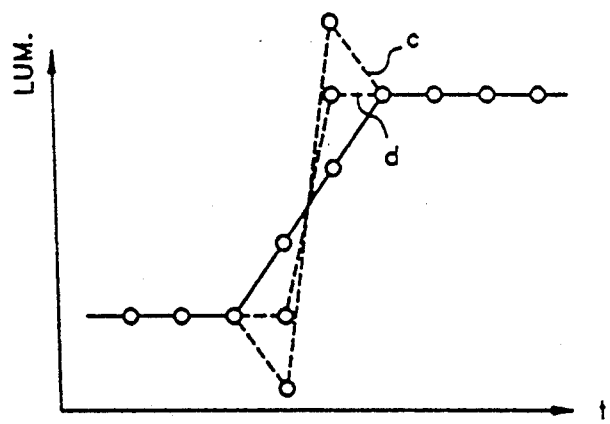

The code generator 130 compares the boosted second differentiated signal to 2N reference signals generated from the reference signal generator 140 to output an M-bit code. N is an integer and M satisfies the equation, $M \geq 3.3 \log(2N+1)$. With the first reference signal ref1, the reference signal generator 140 generates N positive reference signals and N negative reference signals and a step of the reference signals is 1/N. Thus, the input/output data of the multiplication selector 170 of the horizontal edge compensation circuit according to the present invention are represented in the Table. That is, as shown in the Table below, the 2N reference signals and boosted second differentiated signals are compared to generate the M-bit code as represented in the Table in the code generator 130. A signal output from the multiplication selector 170 is selected by the m-bit code. FIG. 17 represents an example where N is 2. If N is 2, four reference signals are supplied and the four reference signals are compared to the boosted second differentiated signal so as to generate a 3-bit code. The multiplication selector 170 multiplies the reshaped first differentiated signal by an amplification rate of the predetermined amplification rates selected by the 3-bit code. The multiplication rate is $1/N \times m$ (m is an integer and $N \geq m \geq -N$). The multiplication selector 170 of FIG. 19 selects one of the amplifiers coupled in parallel to the output terminal of the waveform reshaper 160 by the code output from the code generator 130, and outputs the signal after amplifying the output signal of the waveform reshaper at a predetermined amplification rate, and accordingly the multiplication selector 170 outputs a signal as shown in FIG. 12E having a waveform of a signal resulted from multiplying the signal of FIG. 12C by the signal shown in FIG. 12D. As shown in FIG. 18 and the table, reference signals each having a size of $1/N \times m$ corresponding to the first reference signal ref1 are output from the reference signal generator 140, and signals each having a size of $1/N \times m \times A$ are output from the multiplication selector 170, when A is defined as the size of the reshaped first differentiated signal. The gain of the output signal of the multiplication selector 170 as shown in FIG. 12E is controlled by a gain control signal in the multiplier 180. Receiving the gain-controlled output signal, the adder 200 adds the luminance signal delayed for a certain time in the delay circuit 190 to the output signal of the multiplier 180 to output a horizontal edge-compensated luminance signal Y'. The horizontal edge-compensated signals are the same as those of FIGS. 20A and 20B. In FIG. 20A, roll-off of the signal is controlled according to the value of N as expressed as dotted lines a and b, and in FIG. 20B the emphasis degree of the horizontal edge compensation signal is controlled by gain control. That is, in FIG. 20B, dotted line d represents gain "0" and dotted line C represents the maximum of gain. The final horizontal edge-compensated signal as shown in FIG. 12F is obtained by performing the entire process starting from the input luminance signal Y in a certain interval, whereby transition time of a video signal is reduced to improve a resolution of a picture.

TABLE

| REF. SIGNALS | OUTPUT FROM MUL. SEL. | CODE (Mbit) |
|---|---|---|
| ref1 | A | 111...1 |
| | | \| |
| $\left(\frac{N-1}{N}\right)$ref1 | $\left(\frac{N-1}{N}\right) \times A$ | |
| | | \| |
| $\left(\frac{N-1}{N}\right)$ref1 | $\left(\frac{N-2}{N}\right) \times A$ | |
| | | \| |
| $\left(\frac{N-2}{N}\right)$ref1 | $\left(\frac{N-3}{N}\right) \times A$ | |
| \| | \| | \| |

TABLE-continued

| REF. SIGNALS | OUTPUT FROM MUL. SEL. | CODE (Mbit) |
|---|---|---|
| $\frac{1}{N}$ref1 | $\frac{1}{N} \times A$ | \| |
| 0 | 0 | \| |
| $-\frac{1}{N}$ref1 | $\frac{1}{N} \times A$ | \| |
| \| | \| | \| |
| $-\left(\frac{N-1}{N}\right)$ref1 | $-\left(\frac{N-1}{N}\right) \times A$ | |
| −ref1 | −A | 000...0 |

As described above, the horizontal edge compensation circuit of the present invention differentiates an input luminance signal Y whose level varies to take the absolute value, reshapes the waveform, and then differentiates the first differentiated signal again. If the level of the second differentiated signal is lower than a certain level, the second differentiated signal is boosted up at a certain amplification rate and if the level of the signal is higher than a certain level, the second differentiated signal is bypassed so that the signal is compared to certain signals to generate a code having certain bits.

After that, the waveform reshaped signal is multiplied by a multiplication value selected according to the code to get a horizontal edge compensation signal. Then, the gain of the horizontal edge compensation signal is controlled, and the horizontal edge compensation signal is added to the input luminance signal Y delayed for a certain time to obtain a horizontal edge-compensated signal. By performing the prescribed steps, the present invention improves a resolution without changing a standard bandwidth in the system.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A horizontal edge compensation circuit, comprising:
    delay means for delaying an input luminance signal for a certain time to provide a delayed luminance signal;
    waveform converter means for differentiating said luminance signal to provide a first differentiated signal, for obtaining an absolute value of said first differentiated signal, and for reshaping waveforms of said first differentiated signal to provide a reshaped luminance signal;
    quantization means for differentiating the first differentiated signal to provide a second differentiated signal, for comparing said second differentiated signal with predetermined reference levels to generate a code signal;
    gain control means for selectively multiplying the reshaped luminance signal according to the code signal to control the degree of horizontal edge compensation to provide a horizontal edge compensated signal; and adder means for adding the delayed luminance signal to the horizontal edge compensated signal.

2. The horizontal edge compensation circuit as claimed in claim 1, wherein said waveform converter means comprises:

first differentiator means for differentiating the input luminance signal;

absolute value means for taking the absolute value of said first differentiated signal to provide an absolute value signal; and waveform reshaper means for reshaping the absolute value signal to provide said reshaped luminance signal.

3. The horizontal edge compensation circuit as claimed in claim 2, wherein said waveform reshaper means comprises:

first delay means coupled to receive said absolute value signal, for delaying said absolute value signal for a first delay period to provide a first delayed signal;

second delay means for delaying said first delayed signal for a second delay period to provide a second delayed signal;

comparing means for comparing said first and second delayed signals with said absolute value signal o provide first and second compared signals;

logic means for providing first and second selection signals by logically cross combining said first and second compared signals; and multiplexer means for enabling selective transmission of one of said absolute value signal, and said first and second delayed signals in accordance with said first and second selection signals to provide said reshaped luminance signal.

4. The horizontal edge compensation circuit as claimed in claim 2, wherein said waveform reshaper means comprises:

delay means for sequentially delaying said absolute value signal for a certain time to provide a plurality of delayed signals;

operation means coupled to receive said plurality of delayed signals and said absolute value signal, for successively providing first, second and third reshaping signals;

comparing means for comparing respective amplitudes of said first, second and third reshaping signals to provide a plurality of compared signals logic means for logically combining said plurality of compared signals to provide first and second selection signals; and multiplexer means for enabling selective transmission of one of said plurality of reshaping signals in accordance with said first and second selection signals to provide said reshaped luminance signal.

5. The horizontal edge compensation circuit as claimed in claim wherein said quantization means comprises:

second differentiator means for differentiating the first differentiated signal;

booster means for amplifying the second differentiated signal at a predetermined amplification rate to provide a transition boosted luminance signal if said second differentiated signal has an amplitude lower than a second reference signal;

signal generator means for generating a plurality of reference signals having a certain step therebetween in dependence upon reception of a first reference signal;

code generator means for comparing said transition boosted luminance signal with the plurality of reference signals to generate a certain-bit code signal.

6. The horizontal edge compensation circuit as claimed in claim 5, wherein said booster means comprises:

absolute value means for taking an absolute value of the second differentiated signal to provide an absolute value signal;

comparator means for comparing the absolute value signal with said second reference signal to provide a compared signal;

amplifier means for amplifying said second differentiated signal to provide an amplified signal; and switch means for enabling transmission of one of said second differentiated signal and said amplified signal in accordance with said compared signal.

7. The horizontal edge compensation circuit as claimed in claim 5, wherein said code generator means outputs M-bit codes satisfying $M \geq 3.3 \log (2N+1)$ by comparing said transition boosted luminance signal with 2N reference signals, where M is defined as the bit number of the code signal, and N is an integer value.

8. The horizontal edge compensation circuit as claimed in claim 1, wherein said gain control means comprises:

selector means for multiplying the reshaped luminance signal by selected multiplication factors in accordance with said code signal to provide a selected luminance signal; and multiplier means for providing a gain control signal by controlling the gain of the selected luminance signal.

9. The horizontal edge compensation circuit as claimed in claim 8, wherein said selector means converts said reshaped luminance signal into said multiplied signal of $A \times 1/N \times m$ according to the code signal, where A is defined as the size of said reshaped luminance signal, and N and m are integer values wherein $N \geq m \geq -N$.

10. The horizontal edge compensation circuit as claimed in claim 8, wherein said waveform reshaper means comprises:

first delay means coupled to receive said absolute value signal, for delaying said absolute value signal for a first delay period to provide a first delayed signal;

second delay means for delaying said first delayed signal for a second delay period to provide a second delayed signal;

third delay means for delaying said second delayed signal for a third delay period to provide a third delayed signal;

fourth delay means for delaying said third delayed signal for a fourth delay period to provide a fourth delayed signal;

first adder means for adding said absolute value signal and said second delayed signal to provide a first added signal;

second adder means for adding said first delayed signal and said third delayed signal to provide a second added signal;

third adder means for adding said second delayed signal and said fourth delayed signal to provide a third added signal;

means for obtaining absolute values of said first, second and third added signals to respectively provide first, second and third reshaping signals;

first comparator means for comparing said first reshaping signal and said second reshaping signal to provide a first compared signal;

second comparator means for comparing said second reshaping signal and said third reshaping signal to provide a second compared signal;

third comparator means for comparing said first reshaping signal and said second reshaping signal to provide a third compared signal;

fourth comparator means for comparing said second reshaping signal and said third reshaping signal to provide a fourth compared signal;

first gating means for logically combining said first and second compared signals to provide a first logic signal;

second gating means for logically combining said third and fourth compared signals to provide a second logic signal; and means for enabling selective transmission of one of said first, second and third reshaping signals in accordance with said first and second logic signals to provide said reshaped luminance signal.

11. A horizontal edge compensation circuit for compensating edges of a luminance signal, comprising:

means for receiving a luminance signal;

means for delaying said luminance signal for a first delay period to provide a delayed luminance signal;

means for differentiating said luminance signal to provide a first differentiated luminance signal;

means for obtaining an absolute value of said first differentiated luminance signal to provide an absolute value differentiated signal;

means for reshaping waveforms of said absolute value differentiated signal to provide a reshaped luminance signal;

means for differentiating said first differentiated luminance signal to provide a second differentiated luminance signal;

means for providing a transition boosted luminance signal in dependence upon a comparison of an amplitude of said second differentiated luminance signal with a first reference signal to either amplify said second differentiated luminance signal if said amplitude of said second differentiated luminance signal is lower than said first reference signal or to bypass said second differentiated luminance signal if said amplitude of said second differentiated luminance signal is higher than said first reference signal;

means for comparing said transition boosted luminance signal with a second reference signal to provide a bit code signal;

means for multiplying said reshaped luminance signal with a selected amplification factor in accordance with said bit code signal to provide a multiplied luminance signal;

means for controlling amplitude gains of said multiplied luminance signal in accordance with selected gain factors to provide an edge compensating luminance signal; and means for adding said edge compensating luminance signal to said delayed luminance signal to provide an edge compensated luminance signal.

12. The horizontal edge compensation circuit as claimed in claim 11, wherein said waveform reshaping means comprises:

means for delaying said first differentiated signal in said absolute value for a second delay period to provide a first delay differentiated signal;

second delay means for delaying said first delay differentiated signal for a third delay period to provide a second delay differentiated signal;

means for comparing said first and second delay differentiated signals with said first differentiated signal having said absolute value to provide first and second compared signals;

means for providing first and second selection signals by logically cross combining said first and second compared signals; and means for multiplexing between said first differentiated signal having said absolute value, and said first and second delay differentiated signals in accordance with said first and second selection signals to provide said reshaped luminance signal.

13. The horizontal edge compensation circuit as claimed in claim 11, wherein said waveform reshaping means comprises:

means for sequentially delaying said first differentiated signal having said absolute value for a plurality of delay periods to provide a plurality of delayed differentiated signals;

means for successively providing first, second and third reshaping signals by cross combining said plurality of delayed differentiated signals and said first differentiated signal and obtaining respective absolute values of the combined differentiated signals;

means for comparing respective amplitudes of said first, second and third reshaping signals to provide a plurality of compared signals;

means for logically combining said plurality of compared signals to provide first and second selection signals; and means for multiplexing between said plurality of reshaping signals in accordance with said first and second selection signals to provide said reshaped luminance signal.

14. The horizontal edge compensation circuit as claimed in claim 11, wherein said waveform reshaping means comprises:

means for delaying said differentiated signal having said absolute value for a second delay period to provide a first delay differentiated signal;

means for delaying said first delay differentiated signal for a third delay period to provide a second delay differentiated signal;

means for delaying said second delay differentiated signal for a fourth delay period to provide a third delay differentiated signal;

means for delaying said third delay differentiated signal for a fifth delay period to provide a fourth delay differentiated signal;

means for adding said first differentiated signal having said absolute value and said second delay differentiated signal to provide a first added signal;

means for adding said first delay differentiated signal and said third delay differentiated signal to provide a second added signal;

means for adding said second delay differentiated signal and said fourth delay differentiated signal to provide a third added signal;

means for obtaining absolute values of said first, second and third added signals to respectively provide first, second and third reshaping signals;

means for comparing said first reshaping signal and said second reshaping signal to provide first compared signals;

means for comparing said second reshaping signal and said third reshaping signal to provide second compared signals;

means for logically combining said first and second compared signals to provide first and second logic signals;

means for enabling selective transmission of one of said first, second and third reshaping signals in accordance with said first and second logic signals to provide said reshaped luminance signal.

15. The horizontal edge compensation circuit as claimed in claim 11, wherein said means for providing said transition boosted luminance signal comprises:

means for obtaining an absolute value of said second differentiated signal to provide a second absolute value differentiated signal;

means for comparing said second absolute value differentiated signal with said second reference signal to provide a compared signal;

means for amplifying said second differentiated signal to provide an amplified signal; and means for enabling transmission of one of said second differentiated signal and said amplified signal in accordance with said compared signal to provide said transition boosted luminance signal.

16. The horizontal edge compensation circuit as claimed in claim 11, wherein said bit code signal represents M-bit codes provided by comparing said transition boosted luminance signal with selected 2N reference signals, where N is an integer number, and M is a number of data bit of said bit code signal, satisfying a formula of $M \geq 3.3 \log(2N+1)$.

17. The horizontal edge compensation circuit as claimed in claim 16, wherein said multiplied luminance signal represents an $A \times 1/N \times m$ signal, where A is an amplitude of said reshaped luminance signal, and N and m are integer numbers having a relationship of $N \geq m \geq -N$.

18. A process for compensating horizontal edges of a luminance signal, comprising the steps of:

receiving a luminance signal;

delaying said luminance signal for a first delay period to provide a delayed luminance signal;

differentiating said luminance signal to provide a first differentiated luminance signal;

obtaining an absolute value of said first differentiated luminance signal to provide an absolute value differentiated signal;

reshaping waveforms of said absolute value differentiated signal to provide a reshaped luminance signal;

differentiating said first differentiated luminance signal to provide a second differentiated luminance signal;

providing a transition boosted luminance signal in dependence upon a comparison of an amplitude of said second differentiated luminance signal with a first reference signal to either amplify said second differentiated luminance signal if said amplitude of said second differentiated luminance signal is lower than said first reference signal, or to bypass said second differentiated luminance signal if said amplitude of said second differentiated luminance signal is higher than said first reference signal;

comparing said transition boosted luminance signal with a second reference signal to provide a bit code signal;

multiplying said reshaped luminance signal with a selected amplification factor in accordance with said bit code signal to provide a multiplied luminance signal;

controlling amplitude gains of said multiplied luminance signal in accordance with selected gain factors to provide an edge compensating luminance signal; and adding said edge compensating luminance signal to said delayed luminance signal to provide an edge compensated luminance signal.

19. The process for compensating horizontal edges of a luminance signal as claimed in claim 18, wherein the waveform reshaping step comprises the steps of:

delaying said first differentiated signal in said absolute value for a second delay period to provide a first delay differentiated signal;

delaying said first delay differentiated signal for a third delay period to provide a second delay differentiated signal;

comparing said first and second delay differentiated signals with said first differentiated signal having said absolute value to provide first and second compared signals;

providing first and second selection signals by logically cross combining said first and second compared signals; and multiplexing between said first differentiated signal having said absolute value, and said first and second delay differentiated signals in accordance with said first and second selection signals to provide said reshaped luminance signal.

20. The process for compensating horizontal edges of a luminance signal as claimed in claim 18, wherein the waveform reshaping step comprises the steps of:

sequentially delaying said first differentiated signal having said absolute value for a plurality of delay periods to provide a plurality of delayed differentiated signals;

successively providing first, second and third reshaping signals by cross combining said plurality of delayed differentiated signals and said first differentiated signal and obtaining respective absolute values of the combined differentiated signals;

comparing respective amplitudes of said first, second and third reshaping signals to provide a plurality of compared signals;

logically combining said plurality of compared signals to provide first and second selection signals; and multiplexing between said plurality of reshaping signals in accordance with said first and second selection signals to provide said reshaped luminance signal.

21. The process for compensating horizontal edges of a luminance signal as claimed in claim 18, step of reshaping waveforms comprises the steps of:

delaying said differentiated signal having said absolute value for a second delay period to provide a first delay differentiated signal;

delaying said first delay differentiated signal for a third delay period to provide a second delay differentiated signal;

delaying said second delay differentiated signal for a fourth delay period to provide a third delay differentiated signal;

delaying said third delay differentiated signal for a fifth delay period to provide a fourth delay differentiated signal;

adding said first differentiated signal having said absolute value and said second delay differentiated signal to provide a first added signal;

adding said first delay differentiated signal and said third delay differentiated signal to provide a second added signal;

adding said second delay differentiated signal and said fourth delay differentiated signal to provide a third added signal;

obtaining absolute values of said first, second and third added signals to respectively provide first, second and third reshaping signals;

comparing said first reshaping signal and said second reshaping signal to provide first compared signals;

comparing said second reshaping signal and said third reshaping signal to provide second compared signals;

logically combining said first and second compared signals to provide first and second logic signals;

enabling selective transmission of one of said first, second and third reshaping signals in accordance with said first and second logic signals to provide said reshaped luminance signal.

22. The process for compensating horizontal edges of a luminance signal as claimed in claim 18, wherein the amplifying step comprises the steps of:

obtaining an absolute value of said second differentiated signal to provide a second absolute value differentiated signal;

comparing said second absolute value differentiated signal with said second reference signal to provide a compared signal;

amplifying said second differentiated signal to provide an amplified signal; and enabling transmission of one of said second differentiated signal and said amplified signal in accordance with said compared signal to provide said transition boosted luminance signal.

23. The process for compensating horizontal edges of a luminance signal as claimed in claim 18, wherein said bit code signal represents M-bit codes provided by comparing said transition boosted luminance signal with selected 2N reference signals, where N is an integer number, and M is a number of data bit of said bit code signal, satisfying a formula of $M \geq 3.3 \log(2N+1)$, and said multiplied luminance signal represents an $A \times 1/N \times m$ signal, where A is an amplitude of said reshaped luminance signal, and said N and m are integer numbers having a relationship of $N \geq m \geq -N$.

24. A horizontal edge compensation circuit for compensating edges of a luminance signal, comprising:

means for receiving a luminance signal;

means for delaying said luminance signal for a first delay period to provide a delayed luminance signal;

means for differentiating said luminance signal to provide a first differentiated luminance signal;

means for reshaping waveforms of said differential luminance signal to provide a reshaped luminance signal;

means for differentiating said first differentiated luminance signal to provide a second differentiated luminance signal;

means for providing a transition boosted luminance signal in dependence upon a first comparison of an amplitude of said second differentiated luminance signal with a first reference signal;

means for providing a bit code signal in dependence upon a second comparison of said transition boosted luminance signal with a second reference signal;

means for multiplying said reshaped luminance signal with a selected amplification factor in accordance with said bit code signal to provide an edge compensating luminance signal; and means for adding said edge compensating luminance signal to said delayed luminance signal to provide an edge compensated luminance signal.

* * * * *

UNITED STATES PATENT AND TRADEMARK OFFICE
CERTIFICATE OF CORRECTION

PATENT NO.   : 5,321,511
DATED        : 14 June 1994
INVENTOR(S)  : Byeong-Min Min It is certified that error appears in the above-indentified patent and that said Letters Patent is hereby corrected as shown below:

Column 4,    line 28, change "just" to --first--.

Column 6,    line 38, after "162", insert --a--.

Column 8,    line 68, change "the" to --a--.

Column 11,   line 25, change "o" to --to--;

line 47, after "signals", insert --;--, and line 56, after "claim", insert --1,--.

Column 13,   line 46, after "signal" (second occurrence), insert --,--.

Signed and Sealed this

Eighth Day of August, 1995

Attest:

BRUCE LEHMAN

*Attesting Officer*  *Commissioner of Patents and Trademarks*